(12) United States Patent
Gentle

(10) Patent No.: US 12,509,850 B2
(45) Date of Patent: Dec. 30, 2025

(54) AUTONOMOUS CONTROL OF A MACHINE PERFORMING GRADING

(71) Applicant: Caterpillar Inc., Peoria, IL (US)

(72) Inventor: Michael Charles Gentle, Maroa, IL (US)

(73) Assignee: Caterpillar Inc., Peoria, IL (US)

( * ) Notice: Subject to any disclaimer, the term of this patent is extended or adjusted under 35 U.S.C. 154(b) by 423 days.

(21) Appl. No.: 18/320,371

(22) Filed: May 19, 2023

(65) Prior Publication Data

US 2024/0384503 A1    Nov. 21, 2024

(51) Int. Cl.
E02F 3/84    (2006.01)

(52) U.S. Cl.
CPC .............. *E02F 3/842* (2013.01); *E02F 3/847* (2013.01)

(58) Field of Classification Search
CPC .................................. E02F 3/842; E02F 3/847
See application file for complete search history.

(56) References Cited

U.S. PATENT DOCUMENTS

| | | | |
|---|---|---|---|
| 1,476,917 A * | 12/1923 | Friedrich | A01B 33/025 172/387 |
| 1,504,495 A * | 8/1924 | Friedrich | A01B 33/025 172/77 |
| 3,618,538 A * | 11/1971 | Brannan | A01C 23/025 111/152 |
| 3,807,505 A * | 4/1974 | Nunes | A01G 20/15 172/20 |
| 4,560,207 A * | 12/1985 | Eftefield | E01C 23/121 299/10 |
| 5,332,331 A * | 7/1994 | Critz | E02F 3/7627 404/96 |
| 5,524,560 A * | 6/1996 | Carter | A01B 63/114 701/50 |
| 9,637,889 B2 | 5/2017 | Elkins | |
| 2018/0127948 A1 | 5/2018 | Hernández | |
| 2020/0173135 A1 | 6/2020 | Gentle et al. | |
| 2021/0246636 A1 | 8/2021 | Mathew et al. | |
| 2022/0090353 A1 | 3/2022 | Stenoish et al. | |

FOREIGN PATENT DOCUMENTS

| | | | |
|---|---|---|---|
| AU | 2012216440 B2 | 1/2015 | |
| CA | 3065470 A1 | 6/2021 | |

* cited by examiner

*Primary Examiner* — Russell Frejd

(57) ABSTRACT

A controller may obtain sensor data collected by one or more sensors of a work machine having a ground-engaging implement positionable at an angle that defines a leading edge and a trailing edge of the ground-engaging implement. The sensor data may relate to material being worked by the work machine using the ground-engaging implement. The controller may detect, based on the sensor data, at least one of an accumulation of the material at the leading edge of the ground-engaging implement or a formation of a ribbon of the material forced from the leading edge of the ground-engaging implement. The controller may cause one or more position adjustments for the ground-engaging implement to resolve the at least one of the accumulation or the formation of the ribbon.

20 Claims, 4 Drawing Sheets

AUTONOMOUS CONTROL OF A MACHINE PERFORMING GRADING

TECHNICAL FIELD

The present disclosure relates generally to autonomous control of a machine and, for example, to autonomous control of a machine performing grading.

BACKGROUND

Earthmoving machines, such as motor graders, are used to perform displacement, distribution, and leveling of material, such as soil. For example, a motor grader shapes or levels a ground surface by forcing an implement, such as a blade, to bear against the ground surface over which the motor grader is driven. The motor grader typically includes a linkage assembly for the implement that can control an angle of the implement, raising and lowering of the implement, lateral shifts of the implement, and a pitch of the implement. Due to the many degrees of freedom of the implement, an operator of the motor grader may have difficulty controlling the position of the implement while at the same time monitoring the engagement and displacement of material from the implement. As a result, the position of the implement may permit material to accumulate at a leading edge of the implement and to flow around the leading edge of the implement, thereby producing ribbons of material over surface areas that have been previously worked. Accordingly, areas may need to be reworked one or more times to achieve a particular surface quality, thereby expending additional machine hours, increasing fuel usage, and increasing wear to the implement's cutting edge.

The control system of the present disclosure solves one or more of the problems set forth above and/or other problems in the art.

SUMMARY

A control system for a work machine having a ground-engaging implement, positionable at an angle that defines a leading edge and a trailing edge of the ground-engaging implement, may include one or more implement position sensors configured to detect a position of the ground-engaging implement. The control system may include one or more implement position actuators configured to adjust the position of the ground-engaging implement. The control system may include one or more sensors configured to collect sensor data relating to material being worked by the work machine using the ground-engaging implement. The control system may include a controller configured to obtain the sensor data collected by the one or more sensors, detect, based on the sensor data, at least one of an accumulation of the material at the leading edge of the ground-engaging implement or a formation of a ribbon of the material forced from the leading edge of the ground-engaging implement, and cause at least one of one or more steering adjustments for the work machine or one or more position adjustments for the ground-engaging implement to resolve the at least one of the accumulation or the formation of the ribbon.

A method may include obtaining, by a controller, sensor data collected by one or more sensors of a work machine having a ground-engaging implement positionable at an angle that defines a leading edge and a trailing edge of the ground-engaging implement. The sensor data may relate to material being worked by the work machine using the ground-engaging implement. The method may include detecting, by the controller and based on the sensor data, at least one of an accumulation of the material at the leading edge of the ground-engaging implement or a formation of a ribbon of the material forced from the leading edge of the ground-engaging implement. The method may include causing, by the controller, one or more position adjustments for the ground-engaging implement to resolve the at least one of the accumulation or the formation of the ribbon.

A machine may include a prime mover, a ground-engaging implement positionable at an angle that defines a leading edge and a trailing edge of the ground-engaging implement, one or more sensors configured to collect sensor data relating to material being worked by the machine using the ground-engaging implement, and a controller. The controller may be configured to monitor the sensor data collected by the one or more sensors, detect, based on the sensor data, at least one of an accumulation of the material at the leading edge of the ground-engaging implement or a formation of a ribbon of the material forced from the leading edge of the ground-engaging implement, and cause one or more position adjustments for the ground-engaging implement to resolve the at least one of the accumulation or the formation of the ribbon.

DETAILED DESCRIPTION

This disclosure relates to a control system, which is applicable to any machine that includes a ground-engaging implement. For example, the machine may be a motor grader, a dozer, a loader, a plow, a harvesting machine, or the like.

Figure 1:
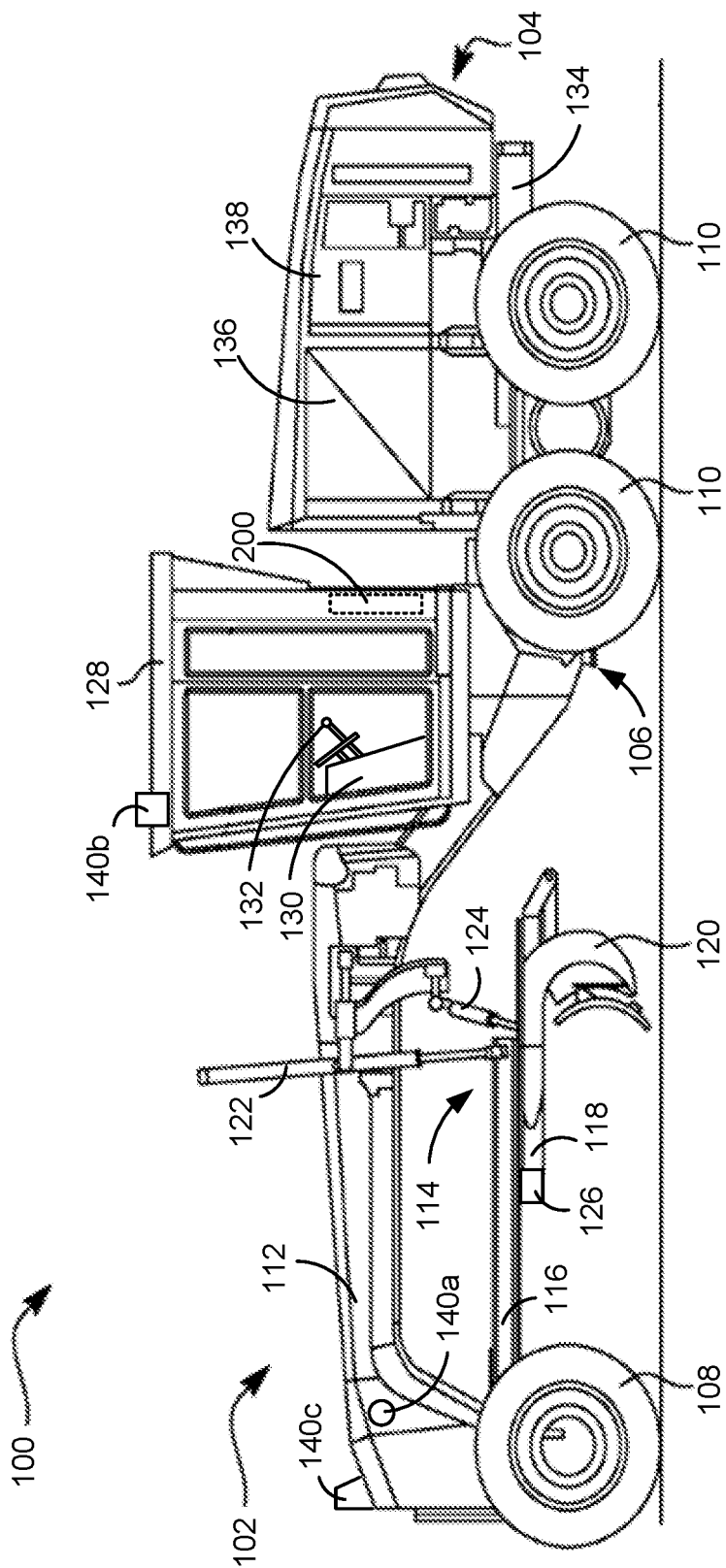
FIG. 1 is a side elevational view of an example machine.

FIG. 1 is a side elevational view of an example machine 100. The machine 100 is a work machine. FIG. 1 shows an example where the machine 100 is a motor grader. However, as described above, the machine 100 may be any machine that includes a ground-engaging implement.

The machine 100 includes a steerable front portion 102 and a driven rear portion 104. An articulated joint 106 (e.g., which includes a hinge) may be between the front portion 102 and the rear portion 104 to permit the front portion 102 and the rear portion 104 to articulate relative to each other. The front portion 102 and the rear portion 104 are supported on front ground engaging members and rear ground engaging members, respectively, which are shown as a pair of front wheels 108 (only a left-side wheel 108 is visible in FIG. 1), supporting the front portion 102, and one or more pairs of rear wheels 110 (only left-side wheels 110 are visible in FIG. 1) supporting the rear portion 104. Alternatively, the ground engaging members may include one or more track assemblies, or the like.

The front portion 102 includes a front frame section 112. A linkage assembly 114 is mounted to the front frame section 112 and may be utilized for grading. The linkage assembly 114 includes a drawbar 116 pivotably mounted to the front frame section 112 (e.g., via a ball joint (not shown)), a circle 118 connected to the drawbar 116, and a ground-engaging implement 120, such as a blade or a moldboard, connected to the circle 118. A position of the drawbar 116 may be controlled by lift cylinders 122 (only one of which is visible in FIG. 1) and a drawbar centershift cylinder 124. The lift cylinders 122 may control raising and lowering of the implement 120 relative to a ground surface and/or tilting of the implement 120 relative to a ground surface (e.g., when lift cylinders 122 are operated independently of each other). The drawbar centershift cylinder 124 may control lateral shifting of the implement 120 relative to the front frame section 112. An angular position of the circle 118 may be controlled by a circle drive motor 126 (e.g., a hydraulic motor). The circle drive motor 126 may control an angle of the implement 120 relative to the front frame section 112.

A position of the implement 120 may be controlled by a blade pitch cylinder (not shown) and/or a blade sideshift cylinder (not shown). The blade pitch cylinder may control a forward or a rearward rotation of a top edge of the implement 120. The blade sideshift cylinder may control lateral shifting of the implement 120 relative to the front frame section 112. Accordingly, the linkage assembly 114 enables the implement 120 to be moved to a variety of different positions. For example, the implement 120 may be positionable at an angle, relative to the front frame section 112, that defines a leading edge (also referred to as a "toe") and a trailing edge (e.g., also referred to as a "heel") of the implement 120. The leading edge of the implement 120 is a forward edge of the implement 120 relative to a travel direction of the machine 100, and the trailing edge is a rearward edge of the implement 120 relative to a travel direction of the machine 100. The "leading edge" of the implement 120 may refer to an end portion of the implement 120 that includes an edge of the implement 120 and a surface of the implement 120 inward from the edge (e.g., an end quarter of the implement 120, an end third of the implement 120, or the like).

The machine 100 may include an operator cab 128. The operator cab 128 may include a console 130 and one or more operator controls 132. The console 130 may include a display, a touchscreen display, and/or one or more operating mode selectors (e.g., buttons, switches, or the like). The operator controls 132 may include a steering mechanism, a speed-throttle, a control lever, a joystick, a touchscreen control, or the like. An operator occupying the operator cab 128 can control various functions of the machine 100 using the console 130 and/or the operator controls 132.

The rear portion 104 includes a rear frame section 134. A prime mover 136 is supported on the rear frame section 134. The prime mover 136 may include an engine (e.g., an internal combustion engine), such as a diesel engine, a gasoline engine, or a gaseous fuel engine, among other examples. Additionally, or alternatively, the prime mover 136 may include an electric motor (e.g., for electric powering of machine 100 or hybrid powering of machine 100 with the engine). The prime mover 136 is configured to propel the machine 100 via the rear wheels 110. The prime mover 136 may be coupled to a hydraulic system 138. The hydraulic system 138 may include one or more pumps (not visible) to drive or power operations of the machine 100, such as steering of the wheels 108 or the wheels 110, or movement of the linkage assembly 114 to control a position of the implement 120.

The machine 100 includes one or more sensors 140 (shown as 140a, 140b, and 140c) configured to detect a size, a shape, a location, and/or a distance of an object. For example, the sensor(s) 140 may be configured to collect sensor data relating material being worked by the machine 100 using the implement 120. A sensor 140 may include an optical sensor, such as a camera (e.g., a two-dimensional camera, a three-dimensional camera, or a stereo camera) or a lidar sensor, a sonic sensor (e.g., an ultrasonic sensor), and/or a radio sensor (e.g., a radar sensor), among other examples.

The sensor(s) 140 may include an accumulation sensor 140a directed at the implement 120 (e.g., at an edge of the implement 120) and configured to collect sensor data relating to an amount of material accumulated at the leading edge of the implement 120. For example, the accumulation sensor 140a may be an optical sensor having a field of view that encompasses the leading edge of the implement 120. The accumulation sensor 140a may be mounted on the front frame section 112.

The sensor(s) 140 may include a ribbon sensor 140b directed at an area rearward of the implement 120 and configured to collect sensor data relating to a ribbon of material forced from the leading edge of the implement 120 (e.g., material that is pushed to the side of the leading edge of the implement 120 due to excess material accumulation at the leading edge of the implement 120). For example, the ribbon sensor 140b may be an optical sensor having a field of view that encompasses the ground surface rearward of the implement 120. The ribbon sensor 140b may be mounted on the operator cab 128.

In some implementations, the machine 100 may include a first sensor set, including a first accumulation sensor 140a and/or a first ribbon sensor 140b, mounted at a first side of the machine 100 (e.g., a left side of the machine 100, such as on a left side of the front frame section 112 and/or a left side of the operator cab 128). The first accumulation sensor 140a may be directed at a first side (e.g., a left side) of the implement 120, and the first ribbon sensor 140b may be directed at an area rearward of the first side of the implement 120. Furthermore, the machine 100 may include a second sensor set, including a second accumulation sensor 140a and/or a second ribbon sensor 140b, mounted at a second side of the machine 100 (e.g., a right side of the machine 100, such as on a right side of the front frame section 112 and/or a right side of the operator cab 128). The second accumulation sensor 140a may be directed at a second side (e.g., a right side) of the implement 120, and the second ribbon sensor 140b may be directed at an area rearward of the second side of the implement 120. Accordingly, if the leading edge of the implement 120 is towards the first side (e.g., a left side) of the machine 100, then the first sensor set can be used to collect sensor data, and if the leading edge of the implement 120 is towards the second side (e.g., a right side) of the machine 100, then the second sensor set can be used to collect sensor data.

The sensor(s) 140 may include a windrow sensor 140c directed at an area forward of the machine 100 and configured to collect sensor data relating to a windrow of material (e.g., material that is pushed to the side of the trailing edge of the implement 120 in connection with a previous grading pass of the machine 100). For example, the windrow sensor 140c may be an optical sensor having a field of view that encompasses the surface forward of the machine 100. The windrow sensor 140c may be mounted on the front frame section 112.

Figure 2:
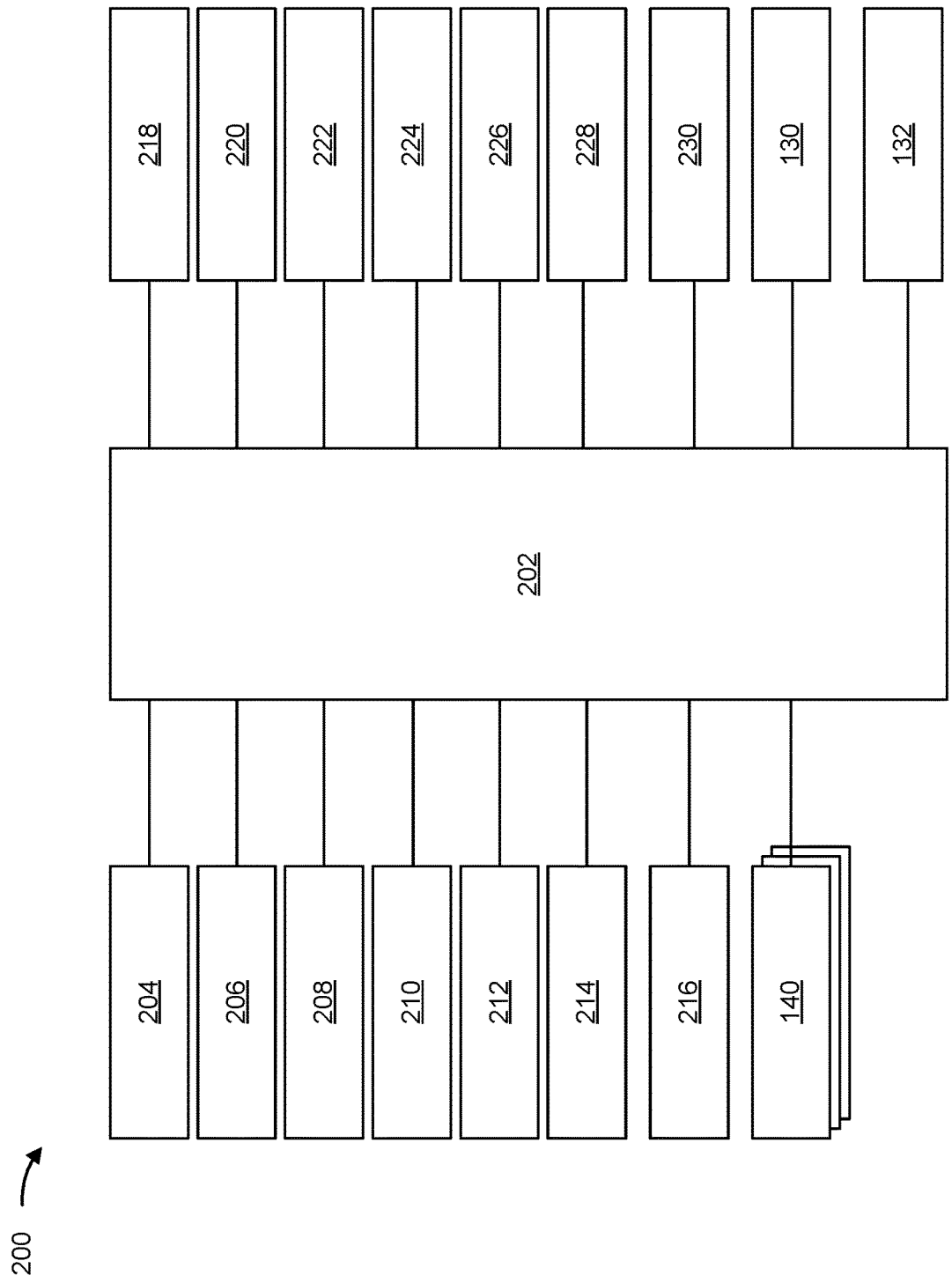
FIG. 2 is a diagram illustrating an example control system.

The machine 100 includes a control system 200, described further in connection with FIG. 2. The control system 200 may enable autonomous grading control for the machine 100. Operations for the autonomous grading control may be performed in connection with an autonomous mode or a semi-autonomous mode of the machine 100.

Alternatively, operations for the autonomous grading control may be performed in connection with an operator assistance mode of the machine 100 that provides autonomous or semi-autonomous operation of particular functions of the machine 100 while the machine 100 is otherwise being operated manually.

As indicated above, FIG. 1 is provided as an example. Other examples may differ from what is described with regard to FIG. 1.

FIG. 2 illustrates a diagram of an example control system 200. The control system 200 includes a controller 202 (e.g., an electronic control module (ECM)). The controller 202 includes one or more memories and one or more processors communicatively coupled to the one or more memories. A processor may include a central processing unit, a graphics processing unit, a microprocessor, a controller, a microcontroller, a digital signal processor, a field-programmable gate array, an application-specific integrated circuit, and/or another type of processing component. The processor may be implemented in hardware, firmware, or a combination of hardware and software. The processor may be capable of being programmed to perform one or more operations or processes described elsewhere herein. A memory may include volatile and/or nonvolatile memory. For example, the memory may include random access memory (RAM), read only memory (ROM), a hard disk drive, and/or another type of memory (e.g., a flash memory, a magnetic memory, and/or an optical memory). The memory may be a non-transitory computer-readable medium. The memory may store information, one or more instructions, and/or software (e.g., one or more software applications) related to the operation of the controller 202.

The control system 200 may include one or more implement position sensors communicatively coupled to the controller 202 and configured to detect a position of the implement 120. For example, the implement position sensors may include a blade sideshift sensor 204 to measure an amount of sideshift of the implement 120, a blade pitch sensor 206 to measure an amount of pitch of the implement 120, a left blade lift sensor 208 to measure an amount of lift at a left side of the implement 120, a right blade lift sensor 210 to measure an amount of lift at a right side of the implement 120, a circle rotation sensor 212 to measure an amount of rotation of the circle 118 (e.g., an angle of the implement 120), and/or drawbar centershift sensor 214 to measure an amount of centershift of the drawbar 116 (e.g., an amount of sideshift of the implement 120), among other examples. As an example, the blade sideshift sensor 204 may be coupled to the blade sideshift cylinder (not shown), the blade pitch sensor 206 may be coupled to the blade pitch cylinder (not shown), the left blade lift sensor 208 may be coupled to a left drawbar lift cylinder 122, the right blade lift sensor 210 may be coupled to a right drawbar lift cylinder 122, the circle rotation sensor 212 may be coupled to the circle 118, and the drawbar centershift sensor 214 may be coupled to drawbar centershift cylinder 124.

The control system 200 may also include a steering angle sensor 216 communicatively coupled to the controller 202 and configured to measure a steering angle or direction of the machine 100. An implement position sensor and/or the steering angle sensor 216 may include an inertial measurement unit (IMU), an angular position or rotary sensor, a linear displacement sensor, or another type of sensor. Additionally, the control system 200 may include the sensors 140, which may be communicatively coupled to the controller 202. As described herein, the sensors 140 may be configured to collect sensor data relating to material being worked by the machine 100 using the implement 120 (e.g., relating to a size, a shape, a location, or the like, of accumulations or formations of the material as the material is being worked), as described herein. In some implementations, multiple sensors may be integrated into a single sensor, or a single sensor may perform the functions described above of multiple sensors.

Based on data from the aforementioned sensors, the controller 202 may generate and provide control signals to one or more actuators communicatively coupled to the controller 202. The actuators may include one or more implement position actuators. For example, the implement position actuators may include one or more blade sideshift actuators 218 to cause sideshifting of the implement 120, one or more blade pitch actuators 220 to cause pitch rotation of the implement 120, one or more left blade lift actuators 222 to cause raising or lowering of a left side of the implement 120, one or more right blade lift actuators 224 to cause raising or lowering of a right side of the implement 120, one or more circle rotation actuators 226 to cause rotation of the circle 118, and/or one or more drawbar centershift actuators 228 to cause centershifting of the drawbar 116, among other examples. As an example, the blade sideshift actuator 218 may control the blade sideshift cylinder (not shown), the blade pitch actuator 220 may control the blade pitch cylinder (not shown), the left blade lift actuator 222 may control a left drawbar lift cylinder 122, the right blade lift actuator 224 may control a right drawbar lift cylinder 122, the circle rotation actuator 226 may control the circle drive motor 126, and the drawbar centershift actuator 228 may control the drawbar centershift cylinder 124.

In addition, the actuators may include one or more steering actuators 230 to control a steering angle of the machine 100, an articulation of the machine 100, a wheel lean of the machine 100, and/or to otherwise control a direction of the machine 100. An actuator may include a control valve or solenoid for a hydraulic cylinder, an electric actuator, or another type of actuator. In some implementations, multiple actuators may be integrated into a single actuator, or a single actuator may perform the functions described above of multiple actuators.

The control system 200 may include the console 130 and/or the operator controls 132, which may be communicatively coupled to the controller 202. For example, the controller 202 may receive an input, provided via the console 130 and/or the operator controls 132, indicating an operational mode for the machine 100. For example, the operational mode may include activation or deactivation of autonomous control of grading operations of the machine 100. Additionally, the controller 202 may output information for presentation on one or more displays of the console 130. For example, the information may indicate whether autonomous control of grading operations is activated or deactivated, a status of autonomous control of grading operations, or the like.

The controller 202 may be configured to perform operations associated with autonomous control of grading operations of the machine 100, as described herein. During a grading operation, the implement 120 may be positioned at an angle (e.g., relative to the front portion 102) that defines a leading edge and a trailing edge of the implement 120, as described herein. For example, the implement 120 may be commanded to the angle by an operator of the machine 100. The controller 202 may detect (e.g., using the circle rotation sensor 212) whether the leading edge of the implement 120 is towards a first side (e.g., a left side) of the machine 100 or towards a second side (e.g., a right side) of the machine 100. The controller 202 may select the first sensor set (e.g., a left side sensor set) or the second sensor set (e.g., a right side sensor set) to collect sensor data, and/or obtain sensor data that is collected by the first sensor set or the second sensor set, based on whether the leading edge of the implement 120 is towards the first side or the second side. For example, the controller 202 may select the first sensor set, or obtain sensor data that is collected by the first sensor set, if the leading edge of the implement 120 is towards the first side, and the controller 202 may select the second sensor set, or obtain sensor data that is collected by the second sensor set, if the leading edge of the implement is towards the second side. Selecting a sensor set may include activating the sensor set (and/or deactivating the other sensor set), obtaining data from the sensor set (and/or rejecting data from the other sensor set), storing data from the sensor set (and/or discarding data from the other sensor set), and/or otherwise using the sensor set (and/or not using the other sensor set).

The controller 202 may obtain sensor data collected by the sensors 140 (e.g., by the sensors 140 of the sensor set selected by the controller 202). The sensor data may relate to material being worked by the machine 100 using the implement 120, as described herein. The sensor data may include one or more images, one or more videos, lidar data (e.g., a point cloud, a three-dimensional model, or the like), and/or ultrasonic data (e.g., a point cloud, a three-dimensional model, or the like), among other examples.

The controller 202 may monitor the sensor data for one or more particular material features, such as accumulation of the material at the leading edge of the implement 120, the formation of a ribbon of the material forced from the leading edge of the implement 120 (e.g., which may be a continuous or a non-continuous ribbon of the material), and/or a windrow. Accordingly, based on the sensor data, the controller 202 may detect an accumulation of the material at the leading edge of the implement 120 (e.g., an amount of accumulation greater than a threshold), may detect the formation of a ribbon of the material forced from the leading edge of the implement 120 (e.g., a location and/or a size of the ribbon), and/or may detect a windrow (e.g., a location of the windrow). In some examples, the controller 202 may generate one or more depth maps based on the sensor data, and the controller 202 may detect the accumulation, the formation of the ribbon, and/or the windrow based on the depth map(s). For example, a depth map may indicate a location and/or a depth of material at the leading edge of the implement 120, a location of edges, a height, and/or a peak of a ribbon, and/or a location of edges, a height, and/or a peak of a windrow. Additionally, or alternatively, if the sensor data includes one or more images that depict the implement 120 and/or the ground surface rearward of the implement 120, then the controller 202 may process the one or more images using a computer vision technique to detect the accumulation, the formation of the ribbon, and/or the windrow. The computer vision technique may include segmentation, edge detection, contour analysis, template matching, and/or a deep learning technique (e.g., convolutional neural network technique).

In some cases, features other than material features (e.g., material accumulation, a ribbon, and/or a windrow) may cause irregularities or noise in the sensor data. For example, environmental features, such as trees, may result in irregularities or noise in the sensor data. Accordingly, the controller 202 may use noise-reduction techniques or devices in conjunction with the sensors 140. For example, a sensor 140 may include a three-dimensional sensor (e.g., a three-dimensional camera, a stereo camera, a lidar sensor, or an ultrasonic sensor) and a two-dimensional camera adapted to provide two-dimensional data. Here, the controller 202 may use the two-dimensional camera to initially identify a general location of a material feature. For example, the controller 202 may use a machine learning model (e.g., trained using a large number of images) to identify a material feature in one or more images captured by the two-dimensional camera. Accordingly, identification of a material feature through the use of two-dimensional data may assist in reducing noise that may be associated with three-dimensional data.

In some implementations, based upon a two-dimensional image, the controller 202 may determine a location of a material feature (e.g., material accumulation, a ribbon, and/or a windrow) relative to the machine 100. The controller 202 may then identify the location of the material feature determined based upon the two-dimensional image on a three-dimensional depth map. This transfer of information from the two-dimensional image to the depth map may be based upon, for example, perspective transform. To more specifically identify the location of the material feature in the depth map, the controller 202 may determine the depth of the material feature at predetermined distances from the three-dimensional sensor in view of the transferred two-dimensional image. The controller 202 may determine the depth based upon a plurality of cross-sections of the depth map. The controller 202 may identify a location of a peak of the material feature in each cross-section in the depth map, and the controller may connect the peak locations by a line to more precisely identify the location of the material feature relative to the machine 100.

In some implementations, the controller 202 may utilize machine learning to detect a material feature (e.g., material accumulation, a ribbon, and/or a windrow) in a two-dimensional image. If the material feature is not detected in the two-dimensional image, then the controller 202 may rely only on data obtained from the three-dimensional sensor. If the material feature is detected in the two-dimensional image, then the controller 202 may transform the material feature from the two-dimensional image to a three-dimensional depth map to remove noisy data in the three-dimensional depth map. The controller 202 may then determine the depth of the material feature at distance intervals from the three-dimensional sensor and using cross-sections of the depth map, as described above.

In some implementations, based on detecting the accumulation and/or the formation of the ribbon, the controller 202 may determine whether the implement 120 is aligned (e.g., centered) with the windrow (e.g., based on the detected location of the windrow). For example, the controller 202 may identify a location of the windrow, as described herein, as well as a center location of the implement 120 (e.g., using the blade sideshift sensor 204 and/or the drawbar centershift sensor 214), and the controller may determine whether the implement 120 is aligned with the windrow and/or determine an amount of misalignment based on the location of the windrow and the center location of the implement 120. Based on a determination that the implement 120 is not aligned with the windrow, the controller 202 may cause one or more steering adjustments for the machine 100 (e.g., in accordance with the amount of misalignment) to align (e.g., center) the implement 120 with the windrow. For example, to cause the steering adjustment(s), the controller 202 may generate (e.g., output) one or more steering control commands (e.g., for the steering actuator 230) that are to cause the steering adjustment(s).

The controller 202 may cause one or more position adjustments for the implement 120 based on detecting the accumulation and/or the formation of the ribbon. In some implementations, the controller 202 may cause the position adjustment(s) based on a determination that the implement 120 is aligned with the windrow (e.g., the implement 120 was already aligned with the windrow or the steering adjustment(s) brought the implement 120 into alignment with the windrow). A type and/or an intensity of the position adjustment(s) may be based on an amount of the accumulation, a density of the accumulation, a location of the accumulation on the implement 120, a height of the ribbon, a width of the ribbon, a shape of the ribbon, and/or a length of gaps in the ribbon, among other examples. To cause the position adjustment(s), the controller 202 may generate (e.g., output) one or more implement control commands (e.g., for the blade sideshift actuator 218, the blade pitch actuator 220, the left blade lift actuator 222, the right blade lift actuator 224, the circle rotation actuator 226, and/or the drawbar centershift actuator 228) that are to cause the position adjustment(s).

A position adjustment may be a pitch adjustment (e.g., a rotation about a horizontal axis through the implement 120, such a forward or rearward rotation of the implement 120), an angle adjustment (e.g., a rotation about a vertical axis through the implement 120, such as a right-side forward or left-side forward rotation of the implement 120), and/or a lateral shift adjustment (e.g., a shift along a horizontal axis through the implement 120, such as a leftward or rightward shift of the implement 120). The pitch adjustment may be increasing a forward pitch of the implement 120 relative to the machine 100. The angle adjustment may be increasing an angle of the implement 120 relative to the machine 100 (e.g., a further forward rotation of the leading edge of the implement 120). The lateral shift adjustment may be shifting the leading edge of the implement 120 closer to a center of the machine 100. The controller 202 may cause the pitch adjustment by generating (e.g., outputting) an implement control command for the blade pitch actuator 220. The controller 202 may cause the angle adjustment by generating (e.g., outputting) an implement control command for the circle rotation actuator 226. The controller 202 may cause the lateral shift adjustment by generating an implement control command for the blade sideshift actuator 218 and/or the drawbar centershift actuator 228.

In some implementations, the controller 202 may cause multiple position adjustments in steps. For example, the controller 202 may cause a first position adjustment for the implement 120, determine whether the first position adjustment resolves the accumulation and/or the formation of the ribbon (e.g., based on the sensor data), and cause a second position adjustment for the implement 120 based on a determination that the first position adjustment does not resolve the accumulation and/or the formation of the ribbon. As an example, the controller 202 may cause a pitch adjustment for the implement 120, determine whether the pitch adjustment resolves the accumulation and/or the formation of the ribbon, and cause an angle adjustment and a lateral shift adjustment for the implement 120 based on a determination that the pitch adjustment does not resolve the accumulation and/or the formation of the ribbon.

In some cases, the steering adjustment(s) alone or the position adjustment(s) alone may resolve the accumulation and/or the formation of the ribbon (e.g., may decrease the accumulation and/or the formation of the ribbon to a threshold level). In other cases, a combination of the steering adjustment(s) and the position adjustment(s) may resolve the accumulation and/or the formation of the ribbon (e.g., may decrease the accumulation and/or the formation of the ribbon to a threshold level). In some examples, the controller 202 may cause the steering adjustment(s) first, and the controller 202 may cause the position adjustment(s) second if the steering adjustment(s) do not resolve the accumulation and/or the formation of the ribbon. Alternatively, the controller 202 may cause the position adjustment(s) first, and the controller 202 may cause the steering adjustment(s) second if the position adjustment(s) do not resolve the accumulation and/or the formation of the ribbon.

During a grading operation, the controller 202 may continuously (e.g., in real time) monitor for accumulation of material at the leading edge of the implement 120 and/or for a formation of a ribbon of material that was forced from the leading edge of the implement 120. Accordingly, the controller 202 may successively cause steering adjustments and/or position adjustments, as described herein, responsive to detecting the accumulation and/or the formation of the ribbon. For example, the control system 200 may be a closed loop system.

As indicated above, FIG. 2 is provided as an example. Other examples may differ from what is described with regard to FIG. 2.

Figure 3:
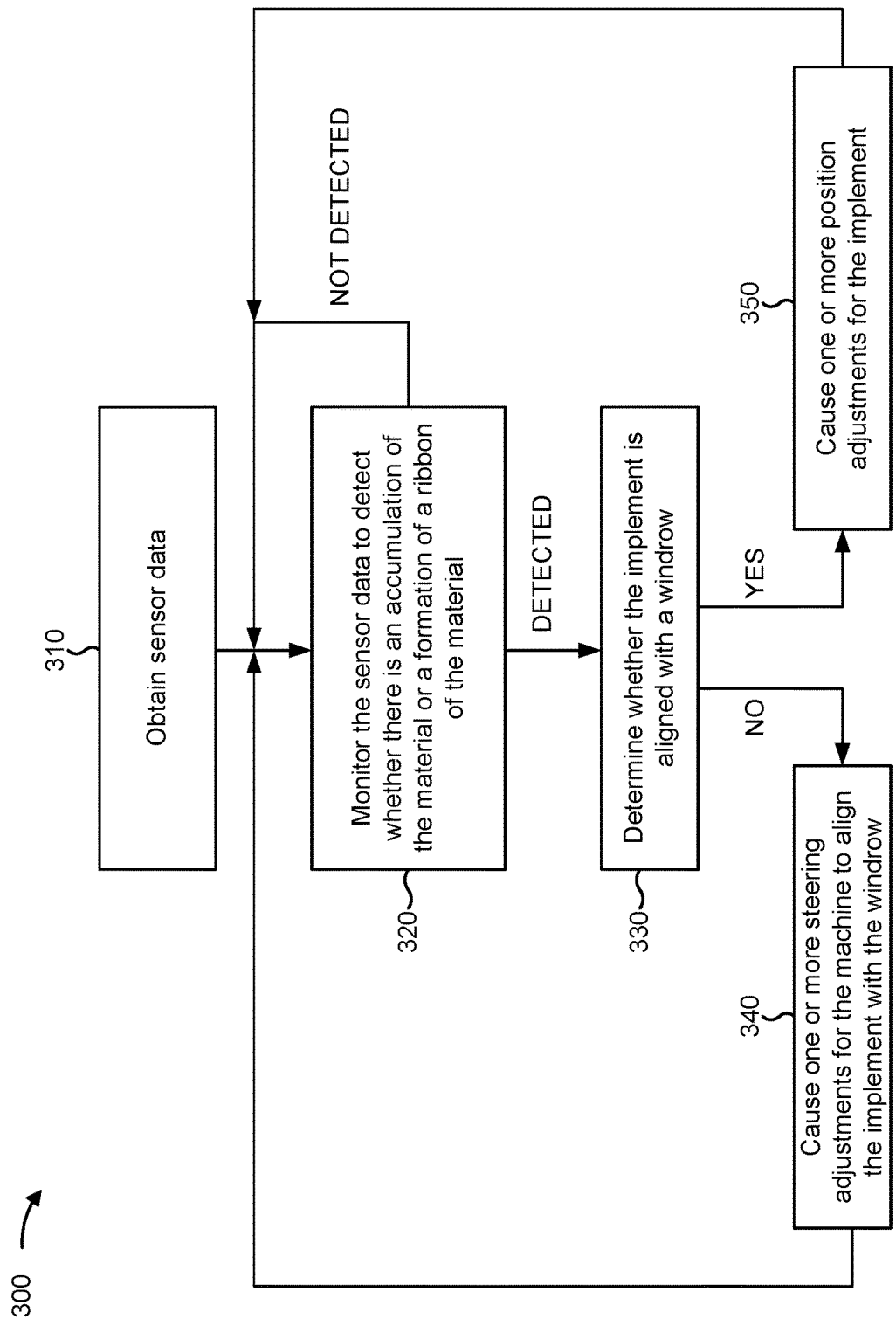
FIG. 3 is a flowchart of an example process associated with autonomous control of a machine performing grading.

FIG. 3 is a flowchart of an example process 300 associated with autonomous control of a machine performing grading. One or more process blocks of FIG. 3 may be performed by the controller 202. Additionally, or alternatively, one or more process blocks of FIG. 3 may be performed by another device or a group of devices separate from or including the controller 202, such as another device or component that is internal or external to the machine 100.

As shown in FIG. 3, process 300 may include obtaining sensor data relating to material being worked by the machine 100 using the implement 120 (block 310), as described above. Process 300 may include monitoring the sensor data to detect whether there is an accumulation of the material at a leading edge of the implement 120 or a formation of a ribbon of the material forced from the leading edge of the implement 120 (block 320), as described above. If the accumulation or the formation of the ribbon is not detected (block 320—NOT DETECTED), then process 300 may return to block 320 (e.g., monitoring of the sensor data may continue).

Based on detecting that there is the accumulation or the formation of the ribbon (block 320—DETECTED), process 300 may include determining whether the implement 120 is aligned (e.g., centered) with a windrow (block 330), as described above. Based on a determination that the windrow is not aligned with the implement 120 (block 330—NO), process 300 may include causing one or more steering adjustments for the machine to align (e.g., center) the implement 120 with the windrow (block 340). Based on a determination that the implement 120 is aligned with the windrow (block 330—YES), process 300 may include causing one or more position adjustments for the implement 120 (block 350). As shown, process 300 may include continuing to obtain and monitor the sensor data to successively perform the operations described above as necessary.

Although FIG. 3 shows example blocks of process 300, in some implementations, process 300 may include additional blocks, fewer blocks, different blocks, or differently arranged blocks than those depicted in FIG. 3. Additionally, or alternatively, two or more of the blocks of process 300 may be performed in parallel.

Figure 4:
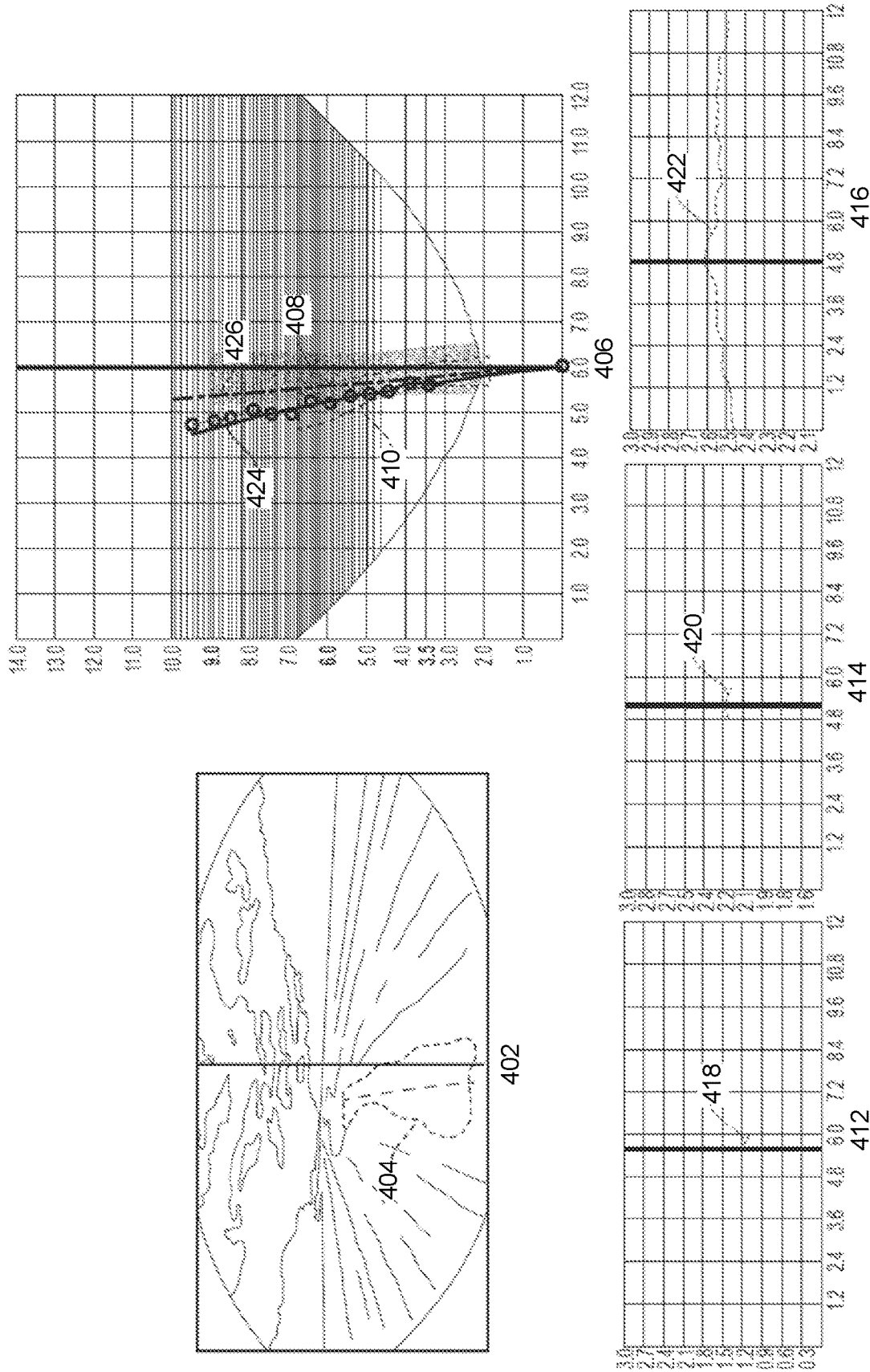
FIG. 4 is a diagram illustrating an example associated with autonomous control of a machine performing grading.

FIG. 4 is a diagram of an example associated with autonomous control of a machine performing grading. In the example of FIG. 4, sensor data may be obtained using a two-dimensional camera and a three-dimensional sensor (e.g., a three-dimensional camera, a stereo camera, a lidar sensor, or an ultrasonic sensor). Panel 402 of FIG. 4 shows a two-dimensional view of a work surface in front of the machine, a windrow 404 being visible in the two-dimensional view. Panel 406 shows a corresponding top down view of a three-dimensional depth map generated from the three-dimensional sensor. The vertical axis of the depth map shows the distance from the sensor forward, while the horizontal axis identifies the transverse direction. The three-dimensional depth map illustrated in panel 406 has been cleaned after noise removal based upon data provided from the identification of a windrow 404 in the two-dimensional view. The windrow 404 may be seen as a slightly shaded portion 408 on the depth map. Using perspective transform, the coordinates of the windrow 404 from the two-dimensional view of panel 402 are likewise illustrated on the depth map of panel 406 as a box framed by a broken line (identified generally as 410 in panel 406). The coordinates 410 of the two-dimensional view relatively closely follow the shaded portion 408 identified on the depth map.

From the depth map, the depth of the work surface is determined at identifiable distances forward the sensor. In this illustration, the depths at 3.5 meters, 6 meters, and 9 meters forward the sensor are shown in the cross-sections of the depth map in panels 412, 414, and 416, respectively. In each of the cross-sections of the depth map, a boldface vertical line identifies the highest peak (418, 420, 422, respectively) of the windrow 404 at the identified distances forward the sensor. The positions where the cross-sections are taken in panels 412, 414, 416 are illustrated in the depth map of panel 406 as horizontal lines at 3.5 meters, 6 meters, and 9 meters. While the illustrated cross-sections are taken at 3.5 meters, 6 meters and 9 meters, these distances are exemplary, and cross-sections may be taken at alternative or additional distances from forward the sensor. The locations of the peak 418, 420, 422 of each respective cross-section of the depth map (panels 412, 414, 416) as well as a plurality of other depths are used to identify the location of the windrow 404 in the depth map (panel 406) with a plurality of circles. A curved line 424 connects the identified peaks 418, 420, 422 of the windrow 404 at various distances in the depth map of panel 406 to graphically illustrate the contour of the windrow 404 within the depth map (panel 406).

Accordingly, referring to the depth map of panel 406, the curved line 424 connecting the location of the identified peaks of the windrow illustrates the determined location of the windrow 404. An accumulation of material and/or a ribbon of material may be identified using a similar technique as described above. A steering angle and/or implement position may then be determined based upon the determined location of the windrow 404, the accumulation of material, and/or the ribbon of material in the depth map (panel 406). In one example, the steering angle may be determined based upon a tangent to the calculated location of the windrow 404, illustrated as a boldface hatched line 426 in panel 406. The steering angle and/or the implement position may be successively updated as the machine 100 moves forward, and successive sensor data is collected by the two-dimensional camera and the three-dimensional sensor.

As indicated above, FIG. 4 is provided as an example. Other examples may differ from what is described with regard to FIG. 4.

INDUSTRIAL APPLICABILITY

The control system described herein may be used with any machine having a ground-engaging implement suitable for performing grading of a surface. For example, the control system may be used with a motor grader that has a ground-engaging implement, such as a blade or a moldboard. Due to the many degrees of freedom of the implement, an operator of the motor grader may have difficulty controlling the position of the implement while at the same time monitoring the engagement and displacement of material from the implement. As a result, the position of the implement may permit material to accumulate at a leading edge of the implement and to flow around the leading edge of the implement, thereby forming ribbons of material over surface areas that have been previously worked. Accordingly, areas may need to be reworked one or more times to achieve a particular surface quality, thereby expending additional machine hours, increasing fuel usage, and increasing wear to the implement's cutting edge.

The control system described herein is useful for providing automatic control of a machine's steering and/or implement to reduce or eliminate the formation of ribbons. In particular, the control system may use one or more sensors, adapted to collect sensor data, to monitor for one or more particular material features in the sensor data, such as an accumulation of material at the leading edge of the implement, a formation of a ribbon of the material forced from the leading edge of the implement, and/or a windrow of the material. Moreover, based on detecting the accumulation of the material and/or the formation of the ribbon of the material, the control system may cause one or more steering adjustments for the machine to align the implement with the windrow and/or cause one or more position adjustments for the implement. In this way, the control system may resolve (e.g., decrease or eliminate) the accumulation of the material and/or the formation of the ribbon of the material. Accordingly, the control system may reduce a number of times that an area is worked in order to achieve a particular surface quality, thereby conserving machine hours, conserving fuel, and extending a useful life of the implement.

The foregoing disclosure provides illustration and description, but is not intended to be exhaustive or to limit the implementations to the precise forms disclosed. Modifications and variations may be made in light of the above disclosure or may be acquired from practice of the implementations. Furthermore, any of the implementations described herein may be combined unless the foregoing disclosure expressly provides a reason that one or more implementations cannot be combined. Even though particular combinations of features are recited in the claims and/or disclosed in the specification, these combinations are not intended to limit the disclosure of various implementations. Although each dependent claim listed below may directly depend on only one claim, the disclosure of various implementations includes each dependent claim in combination with every other claim in the claim set.

As used herein, "a," "an," and a "set" are intended to include one or more items, and may be used interchangeably with "one or more." Further, as used herein, the article "the" is intended to include one or more items referenced in connection with the article "the" and may be used interchangeably with "the one or more." Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A control system for a work machine having a ground-engaging implement positionable at an angle that defines a leading edge and a trailing edge of the ground-engaging implement, the control system comprising:
    one or more implement position sensors configured to detect a position of the ground-engaging implement;
    one or more implement position actuators configured to adjust the position of the ground-engaging implement;
    one or more sensors configured to collect sensor data relating to material being worked by the work machine using the ground-engaging implement; and
    a controller configured to:
        obtain the sensor data collected by the one or more sensors;
        detect, based on the sensor data, at least one of an accumulation of the material at the leading edge of the ground-engaging implement or a formation of a ribbon of the material forced from the leading edge of the ground-engaging implement; and
        cause at least one of one or more steering adjustments for the work machine or one or more position adjustments for the ground-engaging implement to resolve the at least one of the accumulation or the formation of the ribbon.

2. The control system of claim 1, wherein the controller is further configured to:
    detect, based on the sensor data, a windrow of the material,
        wherein the one or more steering adjustments are to center the ground-engaging implement with the windrow.

3. The control system of claim 1, wherein the controller is further configured to:
    detect, based on the sensor data, a windrow of the material; and
    determine whether the ground-engaging implement is aligned with the windrow,
        wherein the controller is to cause the one or more position adjustments for the ground-engaging implement based on a determination that the ground-engaging implement is aligned with the windrow.

4. The control system of claim 1, wherein the one or more position adjustments for the ground-engaging implement include one or more of a pitch adjustment, an angle adjustment, or a lateral shift adjustment.

5. The control system of claim 1, wherein the one or more sensors include a first optical sensor having a first field of view that encompasses the leading edge of the ground-engaging implement and a second optical sensor having a second field of view that encompasses a ground surface rearward of the ground-engaging implement.

6. The control system of claim 1, wherein the one or more sensors include a first sensor set mounted at a first side of the work machine and a second sensor set mounted at a second side of the work machine, and
    wherein the controller is further configured to:
        detect whether the leading edge of the ground-engaging implement is towards the first side of the work machine or towards the second side of the work machine; and
        at least one of select the first sensor set or the second sensor set to collect the sensor data or obtain the sensor data that is collected by the first sensor set or the second sensor set based on whether the leading edge of the ground-engaging implement is towards the first side of the work machine or towards the second side of the work machine.

7. The control system of claim 1, wherein the controller, to detect the at least one of the accumulation or the formation of the ribbon, is configured to:
    generate one or more depth maps based on the sensor data; and
    detect the at least one of the accumulation or the formation of the ribbon based on the one or more depth maps.

8. The control system of claim 1, wherein the sensor data includes one or more images depicting the ground-engaging implement or a ground surface rearward of the ground-engaging implement, and
    wherein the controller, to detect the at least one of the accumulation or the formation of the ribbon, is configured to:
        process the one or more images using a computer vision technique.

9. A method, comprising:
    obtaining, by a controller, sensor data collected by one or more sensors of a work machine having a ground-engaging implement positionable at an angle that defines a leading edge and a trailing edge of the ground-engaging implement,
        the sensor data relating to material being worked by the work machine using the ground-engaging implement;
    detecting, by the controller and based on the sensor data, at least one of an accumulation of the material at the leading edge of the ground-engaging implement or a formation of a ribbon of the material forced from the leading edge of the ground-engaging implement; and
    causing, by the controller, one or more position adjustments for the ground-engaging implement to resolve the at least one of the accumulation or the formation of the ribbon.

10. The method of claim 9, further comprising:
    detecting, by the controller and based on the sensor data, a windrow of the material; and
    causing, by the controller, one or more steering adjustments for the work machine to align the ground-engaging implement with the windrow.

11. The method of claim 9, further comprising:
    detecting, by the controller and based on the sensor data, a windrow of the material; and
    determining, by the controller, whether the ground-engaging implement is aligned with the windrow,
        wherein the controller is to cause the one or more position adjustments for the ground-engaging implement based on a determination that the ground-engaging implement is aligned with the windrow.

12. The method of claim 9, wherein causing the one or more position adjustments for the ground-engaging implement comprises:
    causing, by the controller, a pitch adjustment for the ground-engaging implement;
    determining, by the controller, whether the pitch adjustment resolves the at least one of the accumulation or the ribbon; and
    causing, by the controller, an angle adjustment and a lateral shift adjustment for the ground-engaging implement based on a determination that the pitch adjustment does not resolve the at least one of the accumulation or the ribbon.

13. The method of claim 9, wherein the one or more sensors include one or more optical sensors or one or more sonic sensors.

14. The method of claim 9, wherein causing the one or more position adjustments for the ground-engaging implement comprises:
generating, by the controller, one or more implement control commands that are to cause the one or more position adjustments.

15. A machine, comprising:
a prime mover;
a ground-engaging implement positionable at an angle that defines a leading edge and a trailing edge of the ground-engaging implement;
one or more sensors configured to collect sensor data relating to material being worked by the machine using the ground-engaging implement; and
a controller configured to:
monitor the sensor data collected by the one or more sensors;
detect, based on the sensor data, at least one of an accumulation of the material at the leading edge of the ground-engaging implement or a formation of a ribbon of the material forced from the leading edge of the ground-engaging implement; and
cause one or more position adjustments for the ground-engaging implement to resolve the at least one of the accumulation or the formation of the ribbon.

16. The machine of claim 15, wherein the machine is a motor grader.

17. The machine of claim 15, further comprising:
a front portion supported by a plurality of front ground engaging members, a rear portion supported by a plurality of rear ground engaging members, and an articulated joint between the front portion and the rear portion.

18. The machine of claim 15, wherein the ground-engaging implement is a blade.

19. The machine of claim 15, wherein the controller is further configured to:
detect, based on the sensor data, a windrow of the material; and
cause one or more steering adjustments for the machine to center the ground-engaging implement with the windrow.

20. The machine of claim 15, wherein the controller is further configured to:
detect, based on the sensor data, a windrow of the material; and
determine whether the ground-engaging implement is centered with the windrow,
wherein the controller is to cause the one or more position adjustments for the ground-engaging implement based on a determination that the ground-engaging implement is aligned with the windrow.

* * * * *